Nov. 11, 1958  D. D. ISRAEL  2,860,313
INDUCTIVE TUNING DEVICE
Filed Sept. 4, 1953  3 Sheets-Sheet 1
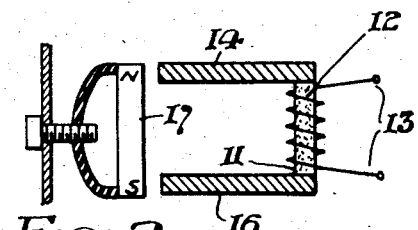
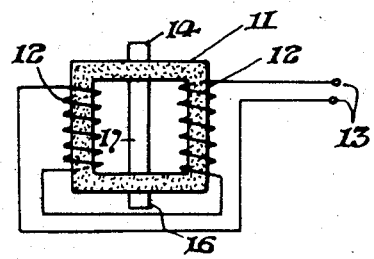
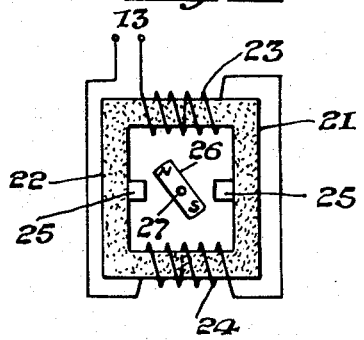
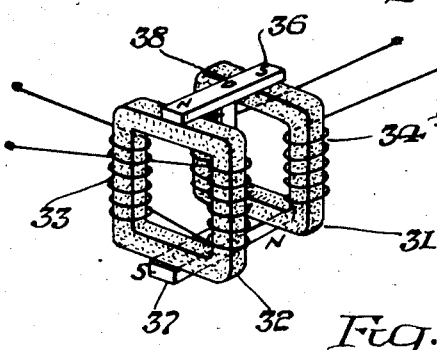
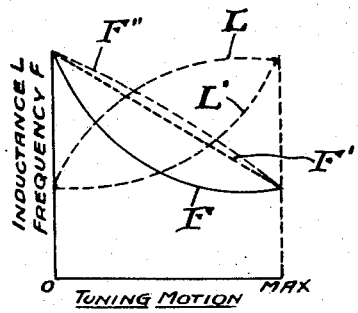
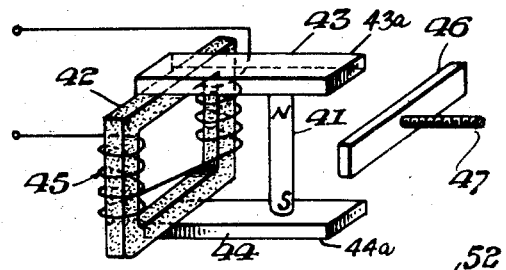
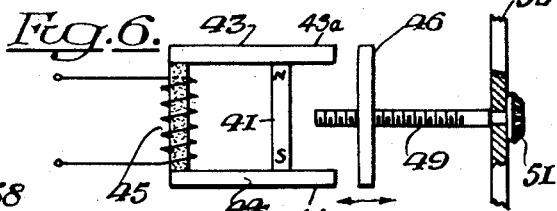
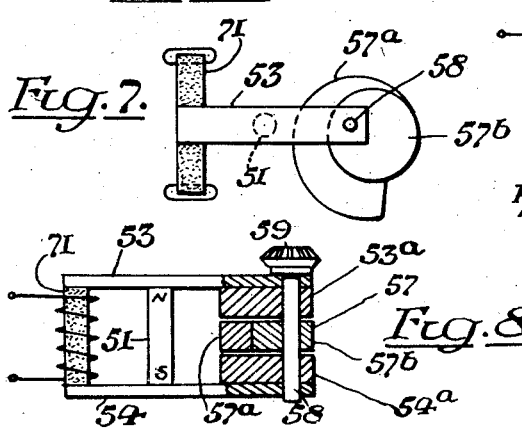
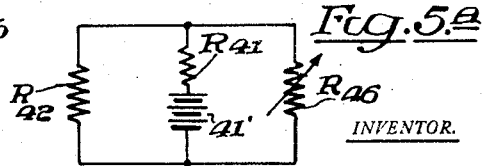
INVENTOR.
Dorman D. Israel
BY Darby & Darby
HIS ATTORNEYS

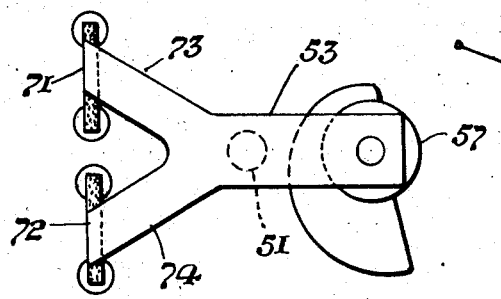
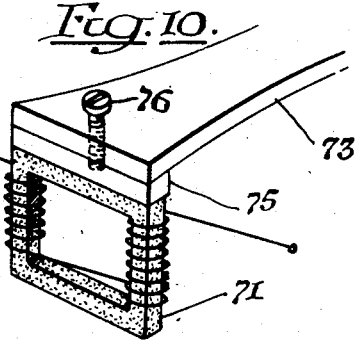
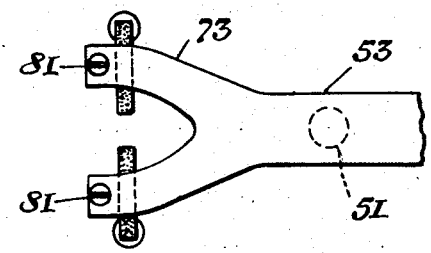
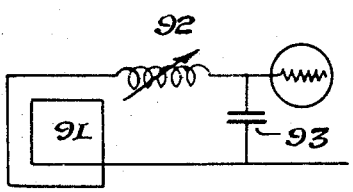
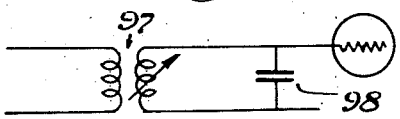
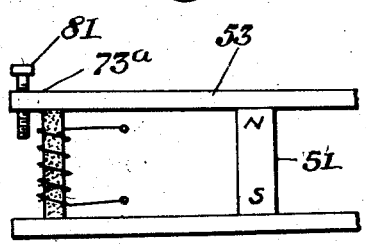
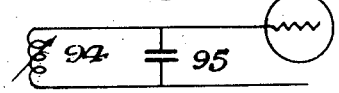
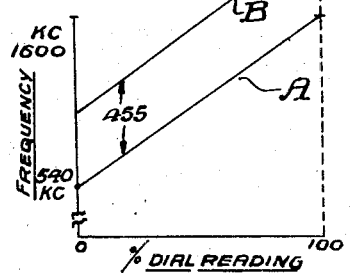
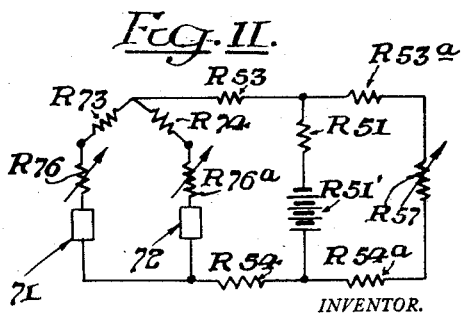

Nov. 11, 1958
D. D. ISRAEL
2,860,313
INDUCTIVE TUNING DEVICE
Filed Sept. 4, 1953
3 Sheets-Sheet 3
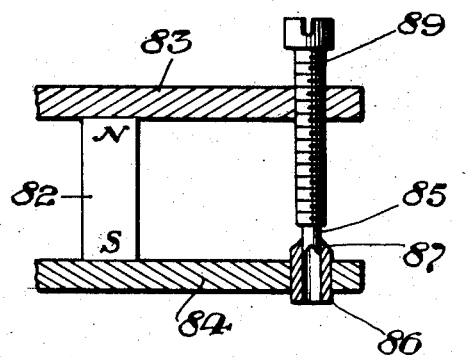
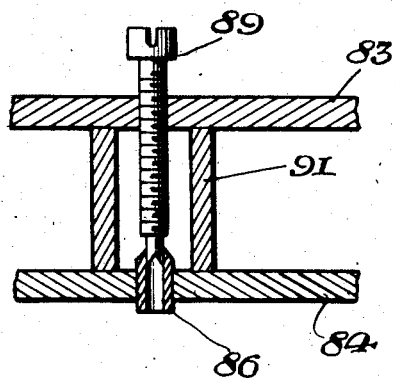
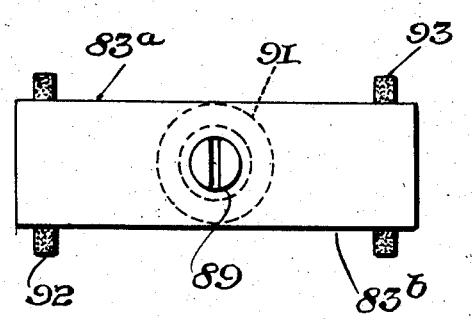
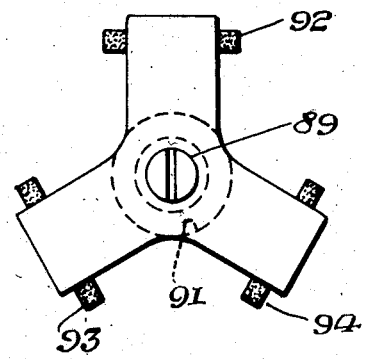
INVENTOR.
Dorman D. Israel
BY Darby & Darby
HIS ATTORNEYS,

United States Patent Office 2,860,313
Patented Nov. 11, 1958

2,860,313
INDUCTIVE TUNING DEVICE

Dorman D. Israel, Harrison, N. Y., assignor to Emerson Radio and Phonograph Corporation, New York, N. Y., a corporation of New York Application September 4, 1953, Serial No. 378,653

2 Claims. (Cl. 336—110)

The present invention relates to the art concerning variable inductive tuning devices and is more particularly concerned with the provision of simple means for varying the inductance of single or multiple coils and for providing improved, simplified extended range tracking for multiple stage or superheterodyne radio receivers or the like.

In the past, the tuning of electrical circuits has been effected primarily by the adjustment of the capacitance of a variable condenser, but also, in some instances tuning has been performed by the adjustment of the inductance of a coil forming part of the tuned circuit, by means of the variable insertion of a core within the coil. It was generally considered more economical and technically feasible to perform tuning with variable capacitors, but these become especially impracticable where miniaturized equipment is concerned, due to the very close spacings required.

Important considerations in the design of a suitable tuner include the factors of simplicity of design and construction, leading to low cost and easy production, the minimization of electrical losses which may be encountered, and the attainment of adequate range and linearity of adjustment of frequency. As a secondary factor, where several tuned circuits are utilized in the same system, such as in radio receivers, the question of tracking such circuits becomes important, particularly where the circuits to be tracked do not have identical resonant frequencies and identical variable elements, as in the case, of the antenna circuit, radio frequency amplifier circuit, and oscillator circuit, respectively, of a superheterodyne receiver. In such cases the relationship between movement or displacement of the tuning control member and the resultant changes in frequency of the tuned circuits becomes highly important, and it becomes necessary that a given change in position of the tuning control member must produce the same equivalent change in frequency in all the tuned circuits conjointly controlled by that member.

The present invention provides a tuning control or inductance control which satisfies to a large extent the factors and considerations discussed, and provides a variable inductance element suitable for wide range inductance control or frequency control, and particularly suitable for substantially linear gang control of tuned circuits, whether of identical or of different frequencies, and adapted to maintain proper tracking.

The present invention utilizes a principle of inductance change through permeability control whose basic concepts have been known, but which has not used the means described herein nor been adapted for the uses and structures presently under consideration. It has been known that iron-core coils may be varied in inductance by variation in the permeability or degree of magnetic saturation of the core, and in various systems utilizing this principle, such as magnetic amplifiers or controllers, it has been customary to provide a saturating winding in addition to the normal coil winding, and to provide an adjustable excitation for the saturating winding which will thereby provide control of the core permeability and hence provide a variable inductance for the main coil.

The present invention also utilizes the variation in permeability of an iron-core coil for inductance adjustment, but provides a simpler, more economical, efficient and useful structure of particular value in miniaturized components.

According to one feature of the present invention, no saturating winding or excitation source are required or used, but instead a permanent magnet is used to provide a source of controllable saturation flux for permeability (and hence inductance) adjustment.

According to another feature of the invention, the inductance or frequency vs. control adjustment characteristic is made substantially linear or of any desired form by providing improved ways of varying the control flux of the permanent magnet.

Other objects and advantages of the present invention will become more readily apparent from consideration of the following detailed description of preferred embodiments of the invention, taken in conjunction with the appended drawings, in which Fig. 1 is a schematic side elevational view of one form of variable inductance device;

Fig. 1A is an end view of the device of Fig. 1;

Fig. 2 shows a similar schematic view of a modified form of variable inductance device adapted for rotational control;

Fig. 3 shows a schematic perspective view of a further rotational inductance control suitable for either single coil or ganged coil operation;

Fig. 4 shows a graph useful in explaining the principles of certain aspects of the present invention;

Fig. 5 shows a schematic perspective view of another form of the present invention;

Fig. 5A shows a schematic circuit diagram of an electrical analogy to the form of the invention shown in Fig. 5;

Fig. 6 shows a side elevational view of a modification of Fig. 5;

Fig. 7 shows a top view of another form of the present invention;

Fig. 8 shows a side view of the form of Fig. 7, partly in section;

Fig. 9 is a top view of another modification of the invention, useful in ganged operation;

Fig. 10 is a fragmentary perspective view of an optional addition to Fig. 9;

Fig. 11 is a schematic circuit diagram of an electrical analogy to the form of the invention shown in Figs. 9 and 10;

Fig. 12 is a graph useful in explaining certain forms of the invention;

Figs. 13 to 15 are schematic circuit diagrams indicating circuits wherein the present invention is useful;

Fig. 16 is a top view of another form of the present invention;

Fig. 17 is a side view of the form of Fig. 16;

Fig. 18 is a fragmentary elevational cross-sectional view of a modified form of adjustable flux-diverting means;

Fig. 19 is a fragmentary elevational cross-sectional view of a modified form of Fig. 18;

Fig. 20 is a top view of a two-coil gang-tuning arrangement embodying the features of Fig. 19; and Fig. 21 is a top plan view of a three-coil gang-tuning arrangement embodying the features of Fig. 19.

According to an important feature of the present invention, the desired inductance variation in a coil is obtained by providing and varying a steady flux in a saturable core for the coil, thereby changing the magnetic permeability of the core and correspondingly changing the inductance of the coil. The basic principles of the present invention may be illustrated with respect to Fig. 1, which shows a closed core 11 of efficient high frequency magnetic material such as pressed powdered iron, ferrite, or the like, upon which are wound coils 12, having terminals 13. Such coils 12 may be used as radio frequency choke coils, or as portions of radio frequency tuned circuits when combined with suitable capacitance, which may, under the present invention, be provided by fixed capacitors. It will be understood that such coils may also form windings of a transformer which may be similarly tuned, useful for example as an intermediate or radio frequency transformer.

It is a property of cores such as 11 that their magnetic permeability depends upon the amount of steady magnetic flux to which the core is subjected. It is a further property of coils such as 12 that their inductance depends upon the permeability of the core. Accordingly, by providing means for varying the permeability of the core, there is thereby provided means for adjusting the inductance of the coil.

Such permeability-adjusting structure is provided in Fig. 1 in the form of a pair of magnetic (such as soft iron) pole pieces 14 and 16, each having one end in magnetic contact with an end of core 11, in combination with a permanent magnet 17, located across the other ends of pole pieces 14 and 16 and schematically illustrated at 18 as laterally translatable. It will be understood that with magnet 17 in its rightmost position, in which a maximum area of each of its pole faces is juxtaposed to the ends of pole pieces 14 and 16, a maximum steady magnetic flux will pass between the north and south poles of magnet 17 by way of pole piece 14, core 11 and pole piece 16. Magnet 17 may be formed of any of the well known materials such as "Alnico" or the like, providing a compact source of large magneto-motive force. Thereupon the relatively low reluctance of the magnetic path between the north and south poles will produce a large steady flux passing through core 11, which will provide a minimum value of inductance for the coils 12. Upon moving the magnet to the left, the total reluctance of the magnetic circuit will be increased by the increased air gaps, permitting less of the steady control flux to pass through the coil core 11, thereby increasing its inductance. At the left extreme position of the range of movement of magnet 17, with a substantial air gap between magnet 17 and pole pieces 14, 16, substantially no steady control flux will pass through the core 11, and maximum inductance will be obtained. By this simple arrangement, a single mechanical movement (of magnet 17) from one extreme to another can provide a variation in inductance over a range exceeding 50 to 1 which, if such a coil is used in conjunction with a fixed capacitor to form a tuned circuit, can produce a variation in resonant frequency of such circuit over a range of more than 7 to 1. If such circuit is used in the radio frequency portion of a radio receiver, it would permit reception from 500 kilocycles to over 3.5 megacycles, covering the entire broadcast band and several short wave bands by a single tuner.

One important aspect and useful feature of this form of the invention, also present in the forms described below, resides in the isolation of the high frequency flux path from the steady flux path. The core 11 is made closed, so that all high frequency flux is confined therein. The steady flux path is made symmetrical with respect to the high frequency flux path, which, combined with the relatively high reluctance of the steady flux path, prevents undue high frequency loss. In addition, the pole pieces may be made of soft iron, reducing their cost and improving the steady flux control operation without adding appreciable loss or loading to the coils themselves, and thereby avoiding the impairment of high frequency performance normally encountered in the use of soft iron.

In some instances the pole pieces may be dispensed with. For example, the core may be tapped and internally threaded to receive a threaded permanent magnet plug, whose adjustable insertion will vary the control flux. This is readily adaptable to hermetic sealing, since adjustment can be effected by sealed bellows or similar arrangements.

While the system of Fig. 1 is directly usable as a variable inductance device for tuning purposes, by modifications described below further refinements and improvements may be made. It will be noted that in the Fig. 1 form adjustment is attained by translational or linear movement. It is usually found simpler to utilize rotational adjustment of tuning control members. Accordingly, where desired the magnet 17 may be pivotally mounted on an axis perpendicular to its length, which in Fig. 1 would be an axis in the plane of the figure. Adjustment in rotary fashion of magnet 17 will now produce the same change in unidirectional control flux as in the form previously described, and will produce a similar but more convenient adjustment of inductance.

As shown in Fig. 2, the core 11 may be formed of two sections 21 and 22, again of ferrite or similar material having low loss at radio frequencies, forming a completely closed core. The coil is formed of two sections 23 and 24, connected in series across terminals 13. Alternatively, the sections 23, 24 may be independent coils having a common core, such as primary and secondary windings of a transformer. The permanent magnet 26 is pivotally adjustable about the axis 27, between soft iron pole pieces 25, and its rotary adjustment will vary the unidirectional control flux within the coil 21, 22, to vary inductance as described above, and providing a desirable rotary form of control. The pole pieces 25 may be omitted where the magnet 26 is sufficiently powerful to overcome the reluctance of air gaps between magnet 26 and cores 21, 22. If desired, magnet 26 could be pivoted about an axis vertical in the figure and in the plane of the paper, instead of axis 27, in which case the magnet 26 would be always in the plane extending horizontally and perpendicular to the plane of the figure.

Where ganged operation is desired, it is of course always possible to physically intercouple and simultaneously vary a plurality of coils of the types shown, such as by using a single shaft to actuate the variable elements of all such coils.

Where desirable to gang two or more coils for simultaneous adjustment, the system of Fig. 3 may also be utilized. In this case a pair of closed cores 31, 32 is provided in parallel planes, each carrying a coil winding 33 and 34 distributed in any suitable manner around the legs of the core, preferably along the vertical legs. A pair of magnets 36 and 37 is disposed in parallel fashion along the axis of rotation 38 symmetrically located between the planes of the cores 31 and 32. The magnet 36 is in a horizontal plane just above the upper horizontal legs of the cores 31, 32. Similarly, the magnet 37 is in a horizontal plane just below the lower horizontal legs of the cores 31 and 32. Each of the magnets 36 and 37 is a bar magnet having north and south poles at opposite extremities. The north pole of magnet 36 is above the south pole of magnet 37 and vice versa. Accordingly, in the position shown in Fig. 3, maximum flux from the magnets will pass through the cores 31 and 32; thus, the flux from the north pole of upper magnet 36 will pass through the vertical legs of core 32, for example, to the opposed south pole of magnet 37, thence through magnet 37 to its north pole and upward through the vertical legs of core 31 to the south pole of magnet 36 to complete the magnetic circuit. When the magnets are turned through 90° from the position shown in Fig. 3, minimum flux will pass through the cores 31 and 32. Here again, by adjustment of position of magnets 36 and 37 simple, efficient, adjustable inductances are provided having wide range and good high frequency efficiency for use in radio or similar circuits. In this form, the coils 33, 34 are closely tracked by virtue of the symmetry of the arrangement, and can be kept substantially at the same inductance throughout their adjustment. Where unequal resonant frequencies are desired, this can be attained by unequal capacitors connected to the respective coils, or by adding a separate inductance in series or parallel with either of the variable inductances.

In the types of system shown in Figures 1, 2 and 3, the inductance of the coil will vary with the gap between the magnet and the core, and hence with displacement of a tuning control member, generally as shown by curve L of Fig. 4. For minimum gap, producing maximum control flux, the inductance is a minimum. Conversely, for maximum gap, producing minimum control flux, the inductance is a maximum. The rate of change of inductance is faster for low values of gap size, since in this region a small change in gap size causes a relatively large change in control flux. Since the resonant frequency of a circuit utilizing such an inductance is an inverse function of the square root of the inductance, it follows that the frequency is a maximum for minimum gap and a minimum for maximum gap, and will vary generally as shown by the curve F of Fig. 4.

It is desirable to provide a substantially linear change of frequency with gap or control movement, such as indicated by the broken line F' of Fig. 4, or to provide a nearly linear curve such as the dotted line curve F'' of Fig. 4. To realize these desirable characteristics it is necessary that the inductance curve of Fig. 4 have opposite curvature, such as shown by the curve L'. This requirement can be met by a modified form of coil tuner illustrated in the subsequent figures.

In Fig. 5 the closed high frequency core 42 is juxtaposed to a pair of magnetic pole pieces 43 and 44, between which is interposed a fixed permanent rod or bar magnet 41. In this way the steady control flux from the magnet 41 passes through the pole piece 43, the core 42, the pole piece 44, and back to the magnet 41 in a complete path. For the purpose of providing an adjustment of this control flux, which in turn will adjust the inductance of coil 45, the pole pieces 43 and 44 are extended beyond the magnet 41 on the side opposite from core 45, as auxiliary pole pieces 43a and 44a, and a variable magnetic shunt 46 is provided, rotatably mounted on a shaft 47. Shunt 46 may desirably be of soft iron, and its shaft 47 may be non-magnetic, although this is not necessary.

This structure provides an adjustable shunt path for the steady control flux, variable in accordance with the position of shunt 46. Thus when shunt 46 is in a vertical position, a maximum amount of control flux will be diverted from the core 42 by the parallel path provided by shunt 46. In the horizontal position shown in Fig. 5, a maximum gap is provided in the parallel path, so that a minimum amount of control flux is diverted, leaving maximum control flux in the core 42 to produce minimum inductance.

The operation of Fig. 5 may be more readily understood from Fig. 5A which shows a schematic circuit diagram of the electrical equivalent of Fig. 5. Here, $R_{42}$ is a resistor corresponding to the magnetic reluctance of core 42 with respect to the steady control flux; $R_{46}$ is a variable resistor corresponding to the variable reluctance provided by shunt 46 and its air gaps; 41' is a battery corresponding to magnet 46; and $R_{41}$ is a resistor representing the internal reluctance of magnet 41 plus any series reluctance provided by its contacts with pole pieces 43 and 44. The pole pieces 43, 44 are ignored since their reluctances in general will be negligible.

By adjusting $R_{46}$, it will be seen that the current in the right loop of the circuit may be varied, thereby varying the volt drop across $R_{41}$, and consequently varying the current through $R_{42}$. In exactly the same way, the adjustment of shunt 46 varies the steady flux in core 42. The proportioning of the various resistors of Fig. 5A, and the corresponding proportioning of the various magnetic reluctances of the magnetic circuit elements of Fig. 5, are derived by simple application of well known circuit theory and properties of materials to derive the desired amount and manner of variation in flux through core 42. In particular, it may be found desirable to interpose further reluctance in series with magnet 41 (corresponding to increasing $R_{41}$) which can readily be done by interposing a suitable air gap or gaps between magnet 41 and pole pieces 43, 44 or by inserting non-magnetic material of selected length and cross-section therebetween.

By an arrangement of this type the variation of inductance with respect to control adjustment is reversed with respect to that in Fig. 3: at the sensitive region, where the gap is small, inductance is now maximum, in converse relation to what existed in the prior forms of the invention. Thus, the desirable curvature of characteristic L' of Fig. 4 is attained, which, by proper choice of dimensions, can provide either the linear frequency relationship F' or the modified relationship F'' shown in Fig. 4.

It will be understood that the primary design factor involved in determining the desired characteristic is obtaining the required variation of control flux in core 42 to provide the necessary variation in inductance. This in turn depends upon the magnetic characteristics of the core, shunt, and pole pieces, the strength of magnet 41, and the particular cross-sectional dimensions of the elements carrying magnetic flux. The relationships between these factors are well known, being analogous to the electric circuit shown in Fig. 5, and the cross-sectional dimensions of the pole pieces 43 and 44, the magnetomotive force of the magnet 41, and the dimensions of the shunt 46 can be readily designed to give the desired relationship by computation or empirical development.

While in Fig. 5 the shunt 46 is illustrated as being rotatably adjustable, in some circumstances this may not be desired because of the inherent magnetic force between the shunt 46 and the magnetized ends of the pole pieces 43 and 44, which would have a tendency to pull the shunt 46 to the minimum gap position. Also, this form is limited to a 90° rotation for complete range of variation, thereby limiting sensitivity of adjustment. These limitations can, of course, be avoided by modified design; the tendency to rotate can be prevented by suitable frictional or locking devices for the shaft 47, and the limitation on sensitivity can be avoided by a translational adjustment for shunt 46 as in Fig. 6, wherein the shunt 46 is translationally adjustable leftward or rightward in any manner, as by a threaded shaft 49, actuated by a knob 51 rotatably mounted on a fixed panel 52. The normal friction of the threads on shaft 49 will maintain shunt 46 in any desired position, and the thread pitch will determine the sensitivity of adjustment.

Where special relationships are desired between the angular displacement of a control knob or shaft and the coil inductance or the resonant frequency of a tuned circuit utilizing a variable inductance device of the type described above, recourse may be had to an arrangement such as in Figs. 7 and 8, which offers advantages in that most of its elements can be simply designed and constructed. In this instance the closed-core coil 71 and pole pieces 53 and 54, between which is interposed the magnet 51, are arranged as in Figs. 5 and 6. However, in this instance, the shunting element 57 is mounted on a shaft 58, having a control knob 59, and is formed of a magnetic portion 57a supported from a non-magnetic portion 57b, secured to the shaft 58. The non-magnetic portion 57b may be of an insulating material such as "Bakelite" or the like, or may be of a non-magnetic conductive material such as brass. The shunt itself is shaped to have a variable radial dimension, so that by rotating the knob 59 and shaft 58 a variable width of the magnetic shunt 57 is interposed between the pole pieces 53 and 54. Where desired, the pole pieces 53 and 54 may be provided with pole faces 53a and 54a reducing the gap therebetween, in which gap the magnetic shunt 57 is positioned. Alternatively these pole faces 53a and 54a may be omitted and the vertical thickness of the shunt 57 increased to fill the space between pole pieces 53 and 54 to the desired extent.

It will be understood that by properly choosing the rate of variation of the radial width of the magnetic shunt 57 in relation to the angular displacement of shaft 58, any desired characteristic of shunting can be obtained, from which the desired variation of inductance and of resonant frequency with respect to the positioning of the knob 59 can be readily obtained.

While the foregoing description has been primarily directed toward a single coil such as used in a lumped constant tuned circuit, or a pair of coils on the same core, it is to be understood that the present invention is equally adaptable to the gang tuning of a plurality of such tuned circuits, or to the simultaneous or interrelated variation of inductance of a plurality of coils. One illustration of this is offered in Fig. 9, using the principles of Figs. 7 and 8. In this Fig. 9, two coils 71 and 72 are to be simultaneously adjusted. In this instance the pole pieces 53 and 54 are bifurcated, as shown at 73 and 74, to provide two parallel magnetic paths from the magnet 51. It will be understood that flux from the magnet 51 separates along the two branches 73 and 74 to pass through the respective cores 71 and 72. The adjustment of shunt 57 will then simultaneously adjust the respective inductances of these coils 71 and 72.

By making the coils, cores and branches 73, 74 identical, direct tracking for equal coils or frequencies may be attained, as for gang tuning of T. R. F. receivers or of I. F. transformers. However, in most cases unavoidable differences occur in manufacturing, making some final adjustment or "trimming" desirable. This can be provided in the manner shown in Fig. 10 showing a nonmagnetic spacer 75 interposed between a pole piece arm 73 and a core 71. A magnetic screw 76 is threaded into pole piece 73 and spacer 75, to adjust the magnetic reluctance offered by spacer 75. The screw 76 may be specially formed to provide a desired sensitivity or variation of adjustment. In this way an individual fine adjustment of inductance can be provided, as is often desired at the low frequency end of the tuning range. It will be clear that a similar trimmer adjustment can be provided on each arm of pole piece 53, and that any desired number of coils may thus be ganged and tracked.

The equivalent circuit of this form of the invention is illustrated in Fig. 11, using the same analogous reference characters as in Fig. 5A. Here the resistors $R_{53}$, $R_{53a}$, $R_{54}$, $R_{54a}$ are included to show that their corresponding magnetic reluctances in the magnetic circuit of Fig. 9 are available as parameters to determine any desired characteristics. The resistors $R_{76}$ and $R_{76a}$ in series with the respective core loads 71, 72 show the effect of the trimmers 76 illustrated in Fig. 10. In some situations the trimmers 76, 76a may be placed magnetically in shunt with their respective cores, rather than in series as in Fig. 9, in which case $R_{76}$ and $R_{76a}$ would be in shunt with 71 and 72 in Fig. 11. The operation of these systems is essentially the same as described above, producing ganged and tracked operation.

In many instances, such as in superheterodyne receivers, the range of variation of inductance or the law of variation of inductance of one circuit may not be the same as that of another. This is illustrated in Figs. 12 to 15. Fig. 13 illustrates the antenna circuit of an inductance-tuned radio receiver, having a loop antenna 91, a variable inductance 92 in series (or, if desired, in parallel) therewith, and a fixed capacitor 93. The desired overall frequency characteristic of such a circuit is shown at A in Fig. 12, for a conventional broadcast receiver for channels between 540 and 1600 kc. Fig. 14 shows a circuit diagram of a tuned radio frequency stage, having a transformer 97 tuned by a capacitor 98. The transformer secondary may be variable in inductance, as illustrated, for tuning purposes, capacitor 98 being fixed. Where one or more such tuned radio frequency stages are used, the same characteristic A of Fig. 12 applies to them as well as to the antenna circuit. Fig. 15 shows the tuned circuit for the oscillator section of a superheterodyne receiver, having a tuning inductance 94 and a semi-fixed capacitor 95 in parallel therewith. The resonant frequency of this circuit, at each position of the tuning control knob, must exceed (or follow behind) that of the antenna circuit by the value of intermediate frequency, industry standardized in the United States at 455 kc., so that it has characteristic B of Fig. 12. The semi-fixed capacitor mentioned is a combination of the inherent circuit and electron tube static capacitances plus an added trimmer or adjustable capacitor well understood in the art and used for the purpose of tracking or matching the circuits near the upper end of the tuning range.

While it is possible to provide these two characteristics A and B by identical inductances, using the arrangements of the above figures, greater flexibility of design and economy is served best by use of unequal inductances. The present invention provides a ready means for accomplishing the proper tracking of such unequal inductances. This is done by properly apportioning the control flux supplied from magnet 51 to the respective coil cores, which is most readily effected by design of the dimensions of the bifurcated arms of branches 73 and 74 of pole pieces 53 and 54. In some instances a further trimming adjustment may be desired, and this can be performed as shown in Figs. 16 and 17 by a magnetic insert or screw 81 inserted in extension 73a of one branch 73 of the pole piece 53, which, in this instance, is provided with an extension beyond the coils 71 and 72. Screw 81 could of course be between coil 73 and magnet 51, if desired. By adjusting the screw 81, the control flux in coil 72 may be diminished slightly with respect to that in coil 71, so as to provide for different inductances, even though the coils and cores may be identically mounted. The method shown in Figs. 9 and 10 could also be used.

A further form of the present invention is shown in Fig. 18 illustrating only the flux shunting arrangement. It will be understood that this arrangement may be used in any of the systems described above, either for single- or multiple-coil inductance control or tuning. In this figure, the pole pieces 83, 84 are on either side of the permanent magnet 82. Threadedly engaged in one of the pole pieces, such as 83, is a magnetic screw 89 with its axis generally parallel to magnet 82. It will be understood that this element need not be a screw, but may be any axially adjustable element of magnetic material. End 85 of screw 89 adjustably telescopes within a magnetic bushing 86 fixed within the other pole piece 84. The configurations of the end 87 of bushing 86 and of the end 85 of screw 89 are specially designed in accordance with the following considerations.

As is shown, the screw end 85 has a cross-section which varies along the axis, gradually reducing the cross-sectional area to a minimum at the very tip. The bushing 86 is also arranged with its end 87 flared away from the axis of screw 89 so that it has a cross-section which varies to a minimum at the tip. As the end 85 of screw 89 approaches the end 87 of bushing 86, the entire flux shunt magnet 81 passes through a relatively small cross-sectional area in the tips of screw end 85 and bushing end 87 to produce heavy saturation as the screw 89 just starts to enter the bushing 86. This limits the shunting flux. As more engagement is effected by further advancement of the screw 89, the magnetic materials of both the screw 89 and the bushing 86 become less saturated, which renders them more effective as magnetic shunts for tuning purposes. By suitable choice of the shapes of the screw end 85 and bushing tip 87, as by tapering their ends or removing magnetic material and/or substituting non-magnetic material, any desired inductance vs. tuning control displacement (i. e., rotation or advancement of screw 89) can be obtained. This might be either a linear inductance variation where desired, or a linear frequency variation where the coil is used in a tuned circuit.

Figure 19 illustrates a further modification using the principles of Fig. 18. In this instance, in place of the solid cylindrical magnet 82 of Fig. 18 there is shown a hollow cylindrical magnet 91. The tuning control screw 89 and bushing 86 are correlated to the pole plates 83 and 84 in the same manner as in Fig. 18, but now coaxially with and within the magnet 91. This symmetrical arrangement provides the same type of tuning control as in Fig. 18, but has the greater advantage of symmetry and compactness.

The device of Fig. 19 is especially adapted for multiple-gang tuning of any desired number of coils. For example, Fig. 20 shows a top plan view arrangement according to Fig. 19 for a pair of coils indicated at 92 and 93. It will be understood that the pole piece portions 83a, 83b and the corresponding lower portions 84a, 84b (not shown) will be proportioned to provide the desired tracking arrangement in accordance with the principles discussed above. Similarly, Fig. 21 shows a three-coil tracking arrangement for coils 92, 93, 94 having the flux shunting arrangement 89, etc. of Fig. 19. It will be readily appreciated that any number of coils may be simultaneously varied and tracked by a common tuning control of this type by providing pole pieces with a corresponding number of radially extending arms similar to those indicated, whereby adjustment of screw 89 simultaneously diverts flux from the coil cores at the ends of these radial arms, to vary their inductances in tracked relationship.

While the above described embodiments are indicated as they apply to a system using one or more permanent magnets as the source of magnetic control, it is to be understood that all of the above circuit-tracking expedients are equally applicable to tuning systems where the source of magnetic energy is electromagnetic, by use of a single winding and current source to produce the magnetic control flux in place of a permanent magnet.

Accordingly, it will be seen that the present invention has provided a simple, inexpensive way of providing an inductance control for coils having a minimum of moving parts and a maximum ease of fabrication, and adapted to produce single or multiple control of coils to provide any desired wide-range variation of inductance as a function of control, particularly adaptable for simplified tracking of tuned circuits for radio receivers.

It is to be understood that the above embodiments of the present invention are to be taken as illustrative only, and are not to be construed in any limiting sense, the present invention being defined solely by the appended claims.

What is claimed is:

1. A ganged high frequency variable inductance device comprising a pair of high frequency cores, each having a winding disposed thereon, a pair of pole pieces each having a pair of arms respectively adjacent said cores, a permanent magnet fixed between said pole pieces, a variable magnetic shunt disposed across said pole pieces, a non-magnetic spacer between at least one of said cores and its adjacent pole piece, and a magnetic insert adjustably positioned within said pole piece and spacer for varying the magnetic reluctance thereof.

2. A pair of tracking ganged high-frequency inductances, comprising a pair of closed high-frequency variable-permeability magnetic cores, a separate coil wound about each of said cores, a pair of magnetic pole pieces each having a bifurcated end with a pair of tips, corresponding tips of said pole pieces being juxtaposed to the opposite ends of a respective one of said cores, a permanent magnet interposed between said pole pieces for supplying permeability-varying magnetic flux to said cores, each of said pole pieces having a further end remote from its bifurcated end, an adjustable magnetic shunt cooperating with said further ends to divert steady flux from said cores, and means for adjusting said shunt relative to said further ends to simultaneously vary the inductances of said coils.

References Cited in the file of this patent

UNITED STATES PATENTS

| | | |
|---|---|---|
| 1,896,510 | Given | Feb. 7, 1933 |
| 2,089,859 | Rypinski | Aug. 10, 1937 |
| 2,159,754 | Wohlfarth | May 23, 1939 |
| 2,179,305 | Stickney et al. | Nov. 7, 1939 |
| 2,255,915 | Kramolin | Sept. 16, 1941 |
| 2,329,021 | Walsh | Sept. 7, 1943 |
| 2,375,911 | Foster | May 15, 1945 |
| 2,466,028 | Klemperer | Apr. 5, 1949 |
| 2,503,155 | Harvey et al. | Apr. 14, 1950 |
| 2,555,511 | Sands | June 5, 1951 |
| 2,563,899 | Wianco | Aug. 14, 1951 |
| 2,579,996 | Barton | Dec. 25, 1951 |
| 2,581,202 | Post | Jan. 1, 1952 |
| 2,703,391 | Gunderson | Mar. 1, 1955 |
| 2,762,020 | Gordon | Sept. 4, 1956 |

FOREIGN PATENTS

| | | |
|---|---|---|
| 170,234 | Austria | Jan. 25, 1952 |